March 8, 1932.  R. LANGEVIN  1,849,010
PROCESS OF DRYING AND REMOVING HOPS FROM THE VINE
Filed Dec. 5, 1930
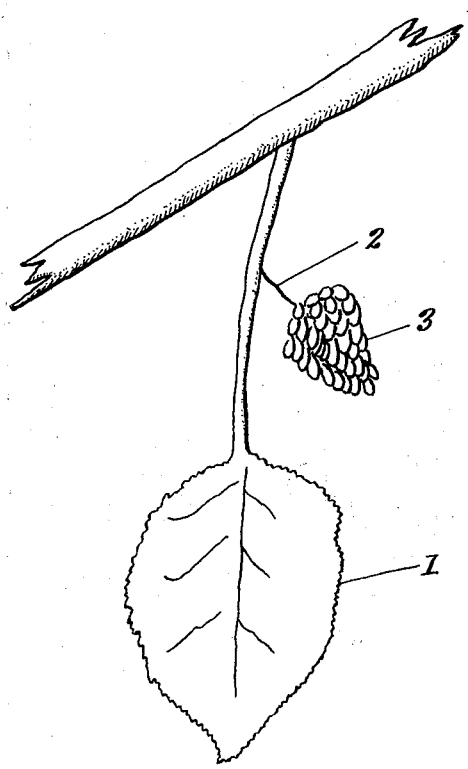
Inventor
Raoul Langevin
By Wilkinson & Mawhinney
Attorneys.

Patented Mar. 8, 1932

1,849,010

UNITED STATES PATENT OFFICE

RAOUL LANGEVIN, OF MOXEE CITY, WASHINGTON

PROCESS OF DRYING AND REMOVING HOPS FROM THE VINE

Application filed December 5, 1930. Serial No. 500,425.

The present invention relates to improvements in processes for picking and drying hops.

Heretofore hops were gathered by pickers, whose practice was to place a basket beneath the vine and to manually strip the clusters of hops from the vine into the basket. The shaking of the vine was found to cause insects, such as spiders and worms, to fall into the basket with the hops. A great quantity of leaves was also necessarily gathered in with the crop, which leaves are one of the greatest annoyances to hop growers, resulting oftentimes in the rejection of an entire crop, entailing considerable financial loss.

In manual picking, many of the hops fall to the ground. On being picked up large quantities of dirt are lifted with them and placed in the baskets by the pickers who are usually careless and interested only in getting weight into the basket, the picking of hops being usually paid for by the pound.

When hops, so picked, are placed upon the dryer floor the heat in the dryer drives the insects to the top and they are at times observable in such quantities as to almost completely cover the hops themselves. The insects are not removed and are dried, together with the leaves and dirt, with the hops and remain in the hops to be baled for the commercial market.

It is an object of the invention to improve the drying of hops and the removal of same from the vine in a more effective and sanitary manner and to provide a commercial product free of leaves, dirt, insects and other foreign matter.

With the foregoing and other objects in view, the invention will be more fully described hereinafter, and will be more particularly pointed out in the claims appended hereto.

The figure is a diagrammatic view of a hop plant showing the stem, leaf and hop cluster.

Referring more particularly to the drawings, 1 designates the leaf shown on a fragment of the plant; 2 shows the thin stem of the hop, and 3 indicates the hop itself connected with the plant by this thin stem 2.

In carrying out the improved process, the whole vine is cut in the field and removed to the drying kiln in which it is placed and subjected to a temperature of 120° to 140° Fahrenheit for a period of two hours more or less according to the size and thickness of the vine.

During this drying period the leaves 1 become as dry as powder and may be removed by beaters, shakers, suction by fan and various other ways. During this beating or shaking or other process, the leaves are crushed and all the dust, insects and crushed leaves are removed from the vines. The hops on the vine, and the vine itself, are still green and tough, which makes it easy to remove the leaves without damage to the hops.

Now that the leaves are removed, the vines are again placed in the dryer for a period of two and one-half to three hours at approximately the same temperature of 120° to 140° Fahrenheit for the purpose of drying the small thin stems 2 which lead to the individual hops 3. After subjecting such stems to this heat for approximately the time indicated, such small stems 2 become dry and brittle. The hop is easily threshed off the vines by beaters, suction of fan, rollers and various other ways in a manner to leave the hop whole and still without damage.

From this point the hops go to the hopper of the top dryer for the final four or five hours of drying.

Also they may be steamed and sulphured at this point and are then ready for the baler.

In effect, the first time the hops are submitted to a drying temperature, the heat and time exposed thereto are sufficient only to dry the leaves; the vine, the stem and the hop itself remains green and tough. The whole vine with leaves and hops attached is then passed through rollers, beaters, or some other device, and the leaves being dry and brittle fall away, leaving the vine, stem and hop. The vine, stem and hops are again submitted to the drying temperature for a given length of time, as above stated, and this exposure to heat is sufficient to dry and render the stem, which attaches the hops to the vine, brittle. The hops themselves are thereupon easily removed by beaters, suction, fans or rollers, and the hop itself is then ready to be placed in the kiln and treated and dried.

What I claim is:

1. An improved process for drying and removing hops from the vine comprising subjecting the vine containing the leaves and the hops to heat until the leaves are thoroughly dried out, removing the dried out leaves, subjecting the same vine containing the hops to further heat treatment until the stems to the hops become dry and brittle, and removing the hops from the vine.

2. An improved process for drying and removing hops from the vine comprising subjecting the whole vine containing the leaves and the hops to a temperature of substantially 120° F. for substantially two hours, removing the leaves and subjecting the same vine containing the hops alone to a temperature of substantially 120° F. for substantially two and one half hours, and removing the hops from the vine.

3. An improved process for drying and removing hops from the vine comprising subjecting the whole vine containing the leaves and the hops to a temperature of substantially 140° F. for substantially two hours, removing the leaves and subjecting the same vine containing the hops alone to a temperature of substantially 140° F. for substantially three hours, and removing the hops from the vine.

RAOUL LANGEVIN.